United States Patent [19]

Schure et al.

[11] 4,173,391
[45] Nov. 6, 1979

[54] THREE DIMENSIONAL DISPLAY

[75] Inventors: Alexander Schure, Old Westbury, N.Y.; William E. Glenn, Ft. Lauderdale, Fla.

[73] Assignee: New York Institute of Technology, Old Westbury, N.Y.

[21] Appl. No.: 893,958

[22] Filed: Apr. 6, 1978

[51] Int. Cl.$^2$ .............................................. G02B 5/16
[52] U.S. Cl. ................................ 350/96.25; 350/130; 353/7
[58] Field of Search ................ 350/96.25, 130; 353/7

[56] References Cited

U.S. PATENT DOCUMENTS

| | | | |
|---|---|---|---|
| 3,402,000 | 9/1968 | Crawford | 350/96.25 |
| 3,864,034 | 2/1975 | Yevick | 350/96.25 |
| 3,909,109 | 9/1975 | Aurenz | 350/96.25 |
| 4,113,348 | 9/1978 | Yevick | 350/96.25 |

*Primary Examiner*—Stewart J. Levy
*Attorney, Agent, or Firm*—Martin Novack

[57] ABSTRACT

The disclosure is directed to an apparatus for receiving a plurality of two-dimensional images and for generating a three-dimensional display from these images. The plurality of two-dimensional images will typically represent different image planes of a desired three-dimensional image. The two-dimensional images may be still pictures, transparencies, motion pictures or images generated by any suitable means. In accordance with the invention, a plurality of flat screen fiber optical magnification units are provided. Each unit includes an input surface defined by the input ends of a multiplicity of fiber optical strands which extend rearwardly and then sidewardly from the input surface and terminate at their output ends which define an output surface that is perpendicular to the input surface. The strands of each unit are supported in a transparent support medium. The image magnification units are disposed one-behind-another with their output surfaces in substantially parallel relationship. Application of the two-dimensional images to the input surfaces of units effects display of a three-dimensional image. The rearmost fiber optical image magnification unit is formed with the fiber optical strands supported in an opaque supporting medium.

4 Claims, 6 Drawing Figures

THREE DIMENSIONAL DISPLAY

BACKGROUND OF THE INVENTION

This invention relates to optical displays and, more particularly, to an apparatus for receiving a plurality of two-dimensional images and for displaying a magnified three-dimensional image as a function thereof.

The realism and information content associated with three-dimensional images has led many prior investigators to develop varied techniques for displaying of three-dimensional images. However, for a number of reasons, especially complexity and expense, three-dimensional imaging has enjoyed only limited commercial acceptance. Equipment for displaying three-dimensional images, in addition to typically being complex and expensive, also generally has the drawback of having a relatively large size. For example, systems which project multiple images from different angles necessarily require substantial room to attain the desired optical effects. Other techniques, including holographic approaches, also typically require specific projection and/or viewing constraints, in addition to the need for optical coherence.

In recent years, fiber optics have been utilized to transfer, magnify, and/or display images. Typically, fiber optic systems employ large numbers of elongated filaments or strands of optically transmissive material which operate on a principle of total internal reflection. Light to be carried from one location to another enters the filament at one end and is internally reflected therein, even around severe bends, with reasonably high efficiency so that most of the light is available at the exit end of the filament. It is known that image magnification can be achieved by bunching the ends of a large number of optical fibers relatively close together at one location to form an input plane and separating the spacing between the other ends of the fibers at another reference plane, called the image output plane. In this manner, the image can be "spread out" or magnified by an amount which depends on the ratio between the fiber spacings in the input plane and the fiber spacings in the output plane. The described type of magnification and display system, while advantageous in some respects, generally tends to be cumbersome and difficult to manufacture which limits its applicability to even a two-dimensional display.

It is an object of the present invention to provide a three-dimensional display which utilizes fiber-optical technology, is not unduly cumbersome, and can be manufactured without undue expense.

SUMMARY OF THE INVENTION

The present invention is directed to an apparatus for receiving a plurality of two-dimensional images and for generating a three-dimensional display from these images. The plurality of two-dimensional images will typically represent different image planes of a desired three-dimensional image. The two-dimensional images may be still pictures, transparencies, motion pictures or images generated by any suitable means. Typically, although not necessarily, a computer may be employed, in conjunction with a plurality of two-dimensional display devices, to generate, to control, or to buffer through the use of computer frame buffers, the desired plurality of two-dimensional images. In accordance with the invention, a plurality of flat screen fiber optical magnification units are provided. Each unit includes an input surface defined by the input ends of a multiplicity of fiber optical strands which extend rearwardly and then sidewardly from the input surface and terminate at their output ends which define an output surface that is perpendicular to the input surface. The strands of each unit are supported in a transparent support medium. The image magnification units are disposed one-behind-another with their output surfaces in substantially parallel relationship. Application of the two-dimensional images to the input surfaces of units effects display of a three-dimensional image. The rearmost fiber optical image magnification unit is formed with the fiber optical strands supported in an opaque supporting medium.

The preferred type of fiber optical image magnification unit for use in the present invention is of the type disclosed in the copending U.S. Patent application Ser. No. 745,187, now U.S. Pat. No. 4,116,739 assigned same assignee as the present application. The referenced application indicates the manner in which such a fiber optics magnification panel can be made. In particular, a plurality of substantially parallel relatively closely spaced fiber optic strands are wrapped about a spacer element. Additional spacer elements are then positioned over the previously wrapped strands and the plurality of strands is then rewrapped over the additional spacer elements. This operation is repeated a desired number of times to obtain a spirally wound construction that is severed along the plane of the first mentioned spacer element. Each resultant portion of this severing operation is then angularly severed to form a pair of wedge-shaped display panels. When construction individual two-dimensional display panels in this fashion, it is generally desirable to employ dark spacer elements, since the spacer elements ultimately become the supporting structure for the fiber optic strands in the display panel, and serve as an optically contrasting material between the ends of the fiber optic strands in the output surface of the display panel. In the present invention, however, it is preferable to have all but one (i.e., the rearmost one) of the display panels formed with transparent supporting material between the fiber optic strands. Accordingly, during the manufacture of most of the individual fiber optical display panels in the manner described, the spacer elements are of a transparent material, such as a transparent plastic.

Further features and advantages of the invention will become more readily apparent from the following detailed description when taken in conjunction with the accompanying drawings.

DESCRIPTION OF THE PREFERRED EMBODIMENT

Figure 1:
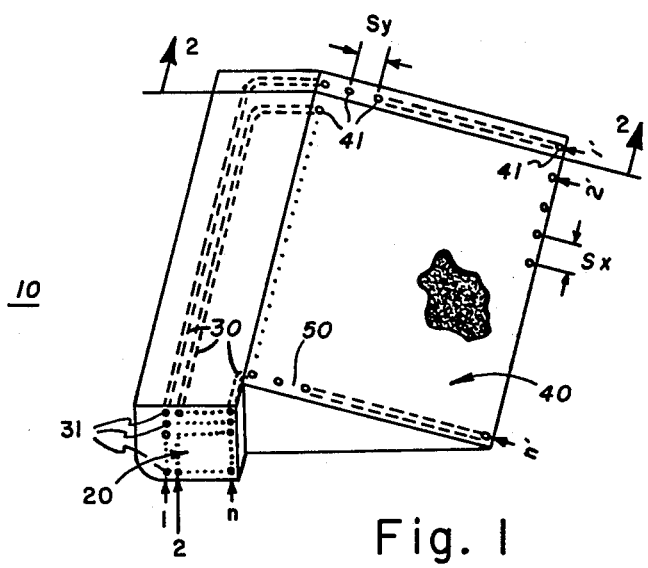
FIG. 1 is an elevational perspective view of a two-dimensional display apparatus which is useful as an element of the present invention.

Referring to FIG. 1, there is shown an optical display apparatus of the type disclosed in the above-referenced copending U.S. application Ser. No. 745,187, now U.S. Pat. No. 4,116,739. The display apparatus 10 includes a light input surface 20 defined by one end 31 of each of a multiplicity of elongated optical carrier strands 30, such as fiber optic strands, the ends 31 being arranged in a relatively closely spaced array of rows and columns. In the illustration, the light input surface 20 is substantially planar, although it will be understood that this surface could vary to some extent from a planar configuration, such as to conform to the shape of a device from which an image is being transferred. A light output surface 40, substantially perpendicular to the light input surface 20, is defined by the other ends 41 of the fiber optic strands 30. The ends 41 are seen to be arranged in a relatively remotely spaced array of rows and columns. The fiber optic strands of the display apparatus 10 are disposed in a supportive material 50 the nature of which will be described further hereinbelow. In the figures the dashed lines generally indicate paths of the strands and dotted lines generally indicate the presence of array elements omitted from the drawings for illustrative clarity.

Figure 3:
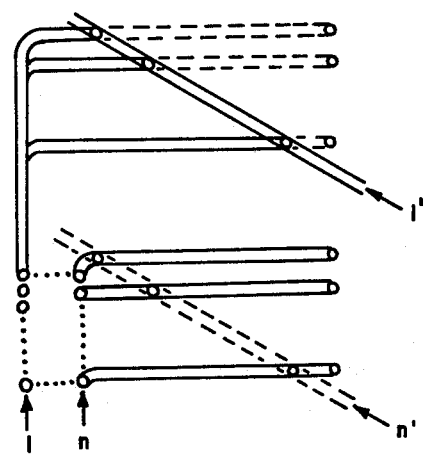
FIG. 3 is a diagramatical view of some of the strands of the apparatus of FIG. 1 and is useful in understanding the configuration of the strands.

To better understand the configuration of FIG. 1, consider the leftmost column of strands of the input surface 20, this column being referred to as column 1 of the input surface. Each strand of this column of strands extends rearwardly to a depth (the term "depth" being with respect to the input surface 20) which is approximately defined by the rearmost edge of the output surface 40 (see FIG. 3). The other ends of the strands of column 1 define a column designated 1' in the array of the output surface 40.

Figure 2:
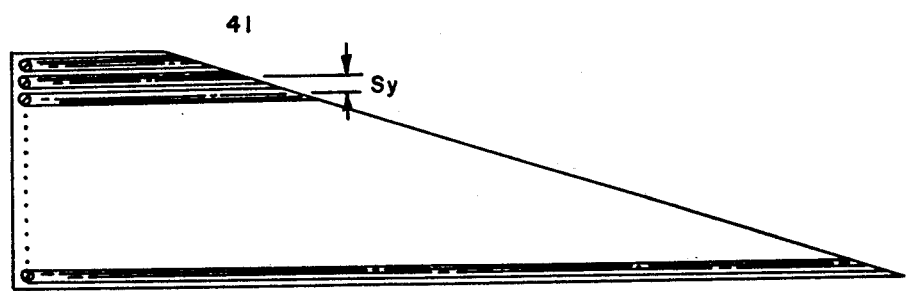
FIG. 2 is a cross-sectional view as taken through a section defined by the arrows 2—2 of FIG. 1.

FIG. 2 is a cross section showing the strands of column 1 at about their point of rearmost extension, and it can be seen that each strand bends sidewardly at its point of greatest depth to an orientation which is substantially parallel to the input surface 20, the other ends of these strands constituting the column 1' of the output surface array. (The columns of the output surface are designated as "columns" due to their relationship with the columns of the input surface. To view them as columns in FIG. 1, the figure can be turned sideways such that column 1' is on the right.)

The next column of strands of the input surface, designated as column 2, extends rearwardly to a depth slightly less than the depth to which the column 1 strands extend, and, as before, each of these strands bends sidewardly at its point of greatest depth to an orientation which is substantially parallel to the input surface. Thus it is seen that each column of strands extends rearwardly from the input surface 20 to a depth which depends upon the column's position in the order of columns; viz., column 1 extending rearwardly by the greatest amount, column 2 extending rearwardly by the next greatest amount, . . . and the last column, designated column n, extending rearwardly the smallest amount.

It is seen from the above that each strand of a column bends sidewardly at its point of greatest depth to an orientation which is substantially parallel to the input surface. The strands of each column are of different length, with each strand of a column terminating at a transverse position which depends upon its row order in the column, such that the other ends (41) of the strands of the columns define columns of the output surface which are at less than a right angle with respect to the columns of the input surface, yielding a wedge-shaped panel. This is illustrated, for example, in FIG. 2 wherein it is seen that the top strand of column 1 terminates at a lesser transverse (or sideward) position than the second-from-the-top strand of column 1 which, in turn, terminates at a lesser transverse position than the third-from-the-top strand of column 1, etc. Accordingly, with each strand of a column terminating at a transverse position which depends upon its row order in the column, the elevation of the light output surface varies uniformly to yield a compact wedge-shaped display panel.

Figure 4:
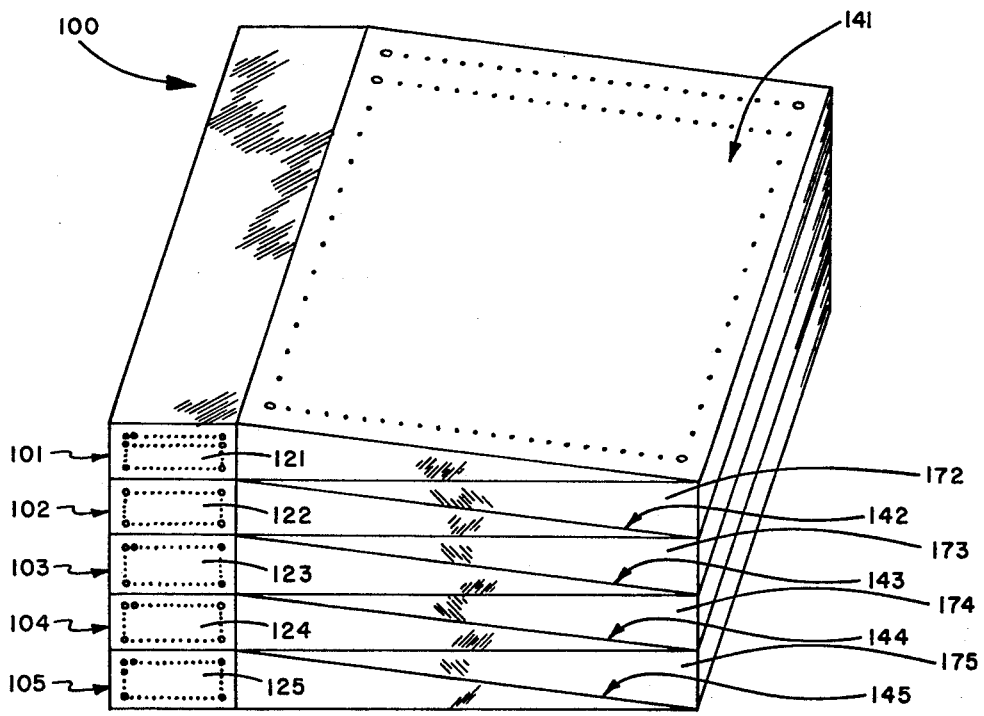
FIG. 4 is an elevational perspective view of a three-dimensional display apparatus in accordance with an embodiment of the invention.
Figure 5:
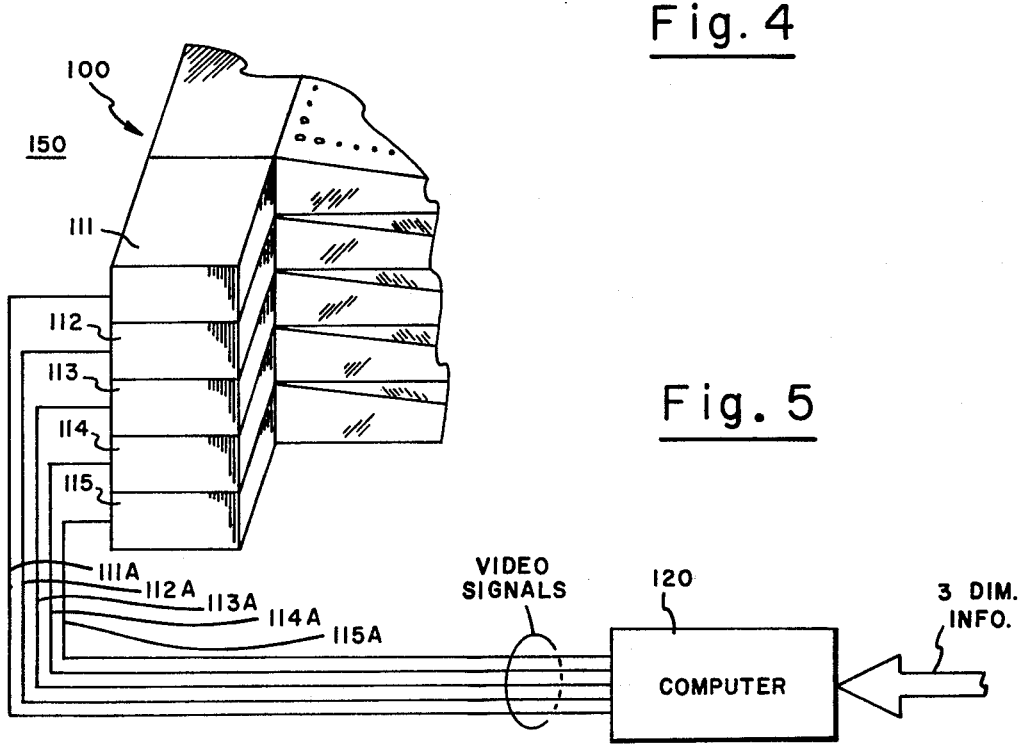
FIG. 5 illustrates one manner in which a plurality of two-dimensional images can be applied to the apparatus of FIG. 4.

Referring to FIGS. 4 and 5, there is shown an embodiment of a three-dimensional display apparatus 100 in accordance with an embodiment of the invention. In the FIG. 5 illustration, a system 150 includes exemplary apparatus, to be described, for generating a plurality of two-dimensional images for application to the display apparatus 100 of the invention. In the present embodiment, five fiber optical image magnification units, of the type illustrated in FIG. 1 and designated by reference numerals 101, 102, 103, 104 and 105, are disposed one-behind-another with the input surfaces thereof, 121, 122, 123, 124 and 125, being arranged in columnar fashion and the output surfaces thereof, 141, 142, 143, 144 and 145, being in a parallel stacked relationship. Each of the fiber optical image magnification units 101 through 105, as described above, is generally in the shape of a wedge. Accordingly, in the present embodiment the units are configured with their output surfaces in mutually parallel relationship by providing four complementary wedge-shaped inserts 172, 173, 174 and 175 between the respective units. The inserts 112 through 115 are preferably formed of an optically transparent material such as a suitable clear plastic. In the present embodiment, the rearmost fiber optical image magnification unit 105 is formed in an optically opaque supporting medium, whereas the image magnification units 101 through 104 are formed in a transparent supporting medium.

In operation, five two-dimensional images are applied to the input surfaces 101 through 105, respectively, of the three-dimensional display 100. The two-dimensional images are displayed, one-behind-another, by the apparatus 100. Since each of the fiber optical magnification units, except for the back unit 105, is transparent, an observer will see the two-dimensional images in the different image planes which are the outputs of the individual two-dimensional image magnification units 101 through 105.

FIG. 5 illustrates one technique for applying computer-generated two-dimensional images to the three-dimensional display apparatus 100, although it will be understood that the invention is not limited to any particular technique for generating a plurality of two-dimensional images. The images can be either monochrome or color and can be either "still" or "motion picture" images. A plurality of devices 111, 112, 113, 114 and 115, each capable of generating a two-dimensional image, have their output screens coupled (either directly, as shown, or via suitable coupling optics) to the input surfaces 121 through 125, respectively, of the two-dimensional image magnification units 101 through 105, respectively. The two-dimensional display units 111 through 115 may be, for example, small color or monochrome television displays. Video and control signals are coupled to the display devices 111 through 115 via cables designated 111A through 115A. If desired, these images can be routed through a computer 120, or generated by the computer 120 from coordinate information representative of a three-dimensional image. Appropriate computer controlled frame buffers may be used as required to produce the proper image ordering and control of color. The described image magnification units 101 through 105 each introduce a mirror image reversal of an input image. Suitable means, electronic or optical, can be employed to effect a cancelling pre-reversal. For example, in the case of an electronically generated display, the horizontal scanning direction can be reversed. Of course, if the images are computer generated, a suitable reversal can be programmed into the image generation routine.

Figure 6:
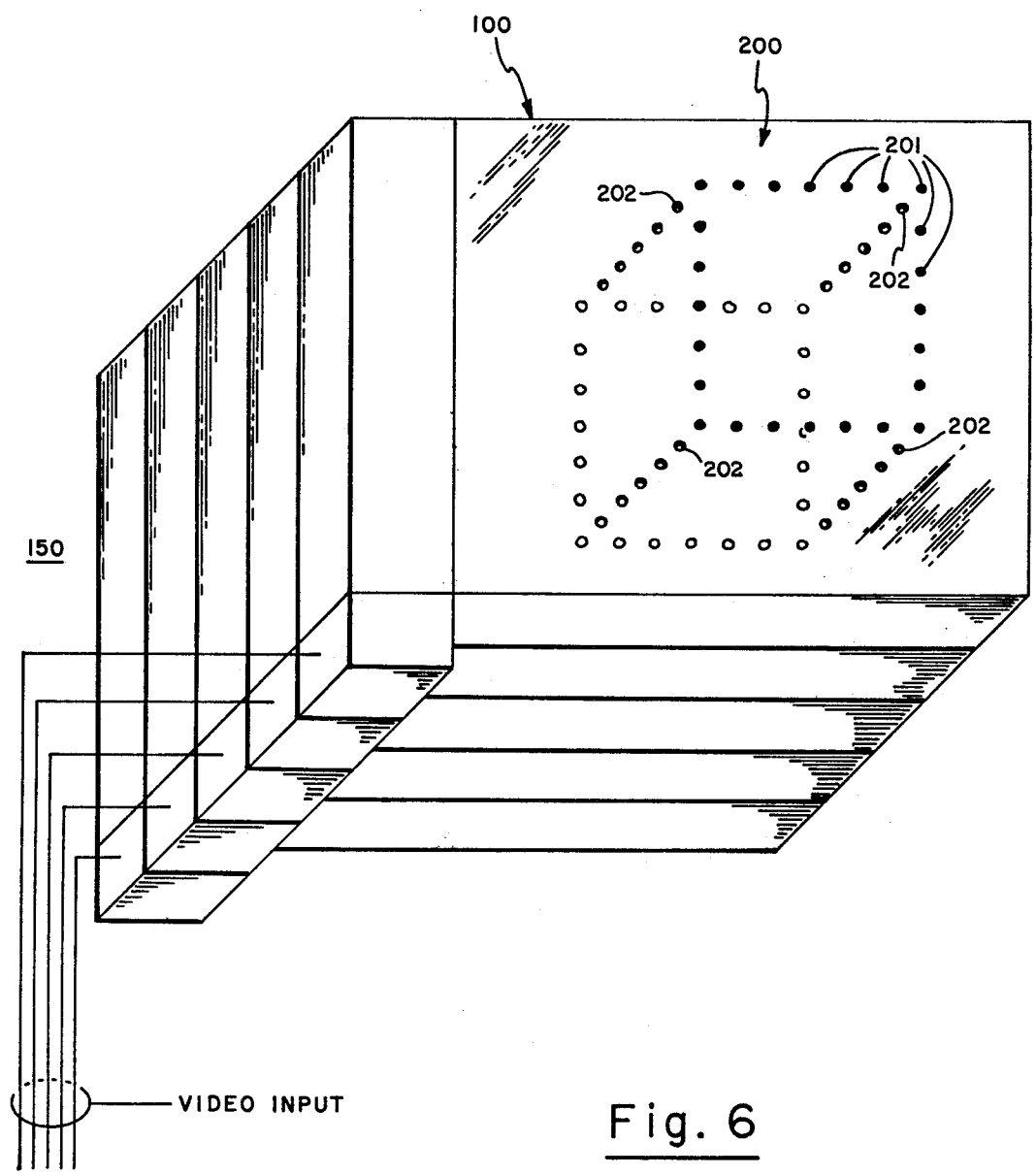
FIG. 6 illustrates the type of display which appears on the apparatus of FIG. 4.

FIG. 6 illustrates the manner in which a three-dimensional image is presented on the display apparatus 100 of the invention. In FIG. 6, a cube 200 is shown as being displayed by the apparatus 100. The face of the cube closest to the observer is the two-dimensional image represented by the dots 201, these dots actually being illuminated fiber optic strands in the front image magnification unit 101. Accordingly, the input image to unit 101 is a square which includes the points 201. The input image to the unit 102 is represented by the dots 202, and so on.

We claim:
1. Apparatus for receiving a plurality of two-dimensional images and for generating a three-dimensional display from said images, comprising:
   a plurality of fiber optical image magnification units, each unit comprising an input surface defined by the input ends of a multiplicity of fiber optical strands which extend rearwardly and then sidewardly from the input surface and terminate at their output ends which define an output surface that is perpendicular to the input surface, said strands being supported in a transparent support medium;
   said image magnification units being disposed one behind another with their output surfaces in substantially parallel relationship;
   whereby upon application of said two-dimensional images to said input surfaces a three-dimensional image is generated by the output ends of said strands.
2. Apparatus as defined in claim 1 wherein the rearmost unit has strands supported in an opaque support medium.
3. Apparatus as defined in claim 1 wherein said plurality of units comprises at least five units.
4. Apparatus as defined by claim 2 wherein said plurality of units comprises at least five units.

* * * * *